C. T. PFLUEGER.
SPOON HOOK.
APPLICATION FILED AUG. 2, 1916.
1,209,020.
Patented Dec. 19, 1916.
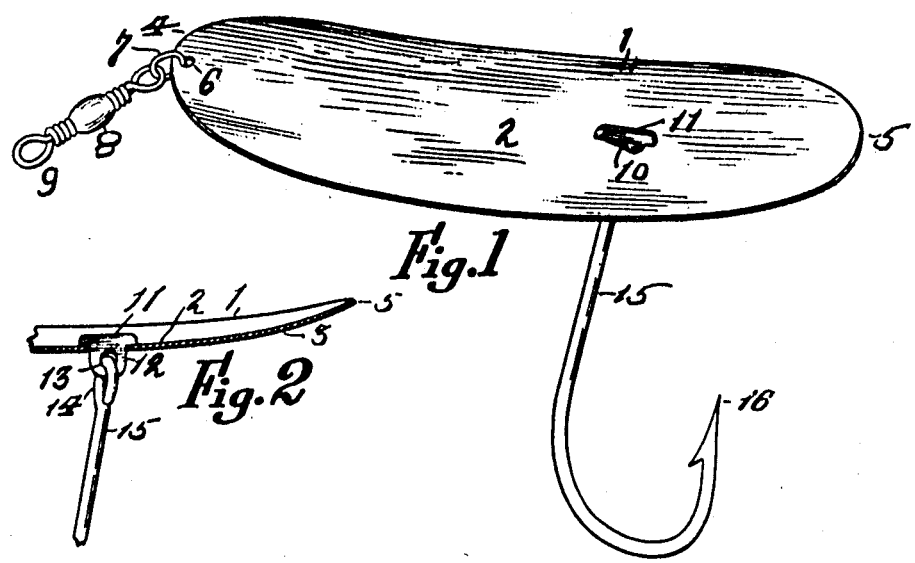
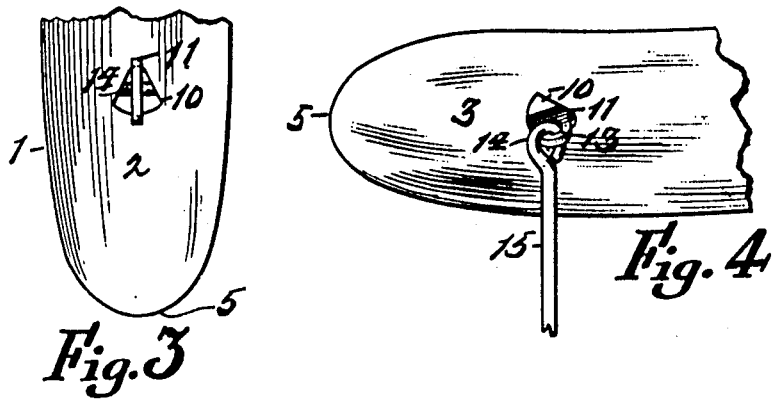
Inventor
Charles T. Pflueger,
By C. E. Humphrey,
Attorney

UNITED STATES PATENT OFFICE.

CHARLES T. PFLUEGER, OF AKRON, OHIO, ASSIGNOR TO THE ENTERPRISE MANUFACTURING COMPANY, OF AKRON, OHIO, A CORPORATION OF OHIO.

SPOON-HOOK.

1,209,020.

Specification of Letters Patent.   Patented Dec. 19, 1916.

Application filed August 2, 1916.   Serial No. 112,743.

*To all whom it may concern:*

Be it known that I, CHARLES T. PFLUEGER, a citizen of the United States, residing at Akron, in the county of Summit and State of Ohio, have invented new and useful Improvements in Spoon-Hooks, of which the following is a specification.

This invention relates to improvements in spoon hooks or lures for fishermen's use and the object of the invention is to provide a device equipped with a spoon or lure constituting a bait, with a hook attached thereto in such a manner that the hook is freely movable and will under normal conditions be positioned, when in use, with the sharp point of the hook in alinement with the concave inner face of the spoon or lure.

The invention more particularly resides in the means for connecting the hook with the spoon or lure so as to permit free movement of the hook with respect to the spoon or lure said connecting means serving to hold the hook normally with the barbed end thereof in proper position for utilizing the bait and also so holding it as to prevent "cocking" or fouling of the hook with respect to the bait or line.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the matter hereinafter claimed.

In the drawings in which similar reference numerals indicate like parts in the different figures, Figure 1, is a perspective view of a spoon hook or lure embodying this invention. Fig. 2, is a longitudinal, sectional view of the rear portion of the spoon or lure showing the connecting medium employed for holding the hook. Fig. 3, is a plan view of the concave face of the spoon or lure, and Fig. 4, is a similar view of the convex side of the spoon or lure.

The device comprises a spoon or lure 1 preferably of metal having a concave face 2 and a convex face 3 so that the spoon or lure is in the form of an arcuate curve both in transverse and longitudinal section. The spoon or lure 1 will preferably be of polished metal although the color or finish thereof is immaterial to this invention. The spoon or lure is further provided with rounded ends 4 and 5. At the end 4 of the spoon or lure is an aperture 6 to receive a link 7 connected with which is a swivel 8 provided with an eye 9 arranged to be attached to a fishing line.

Disposed transversely centrally of the spoon or lure and near the rounded end 5 is a sector-shaped opening 10 with the apex toward the front end of the spoon or lure and with the concave base of the opening reversely positioned.

Mounted in the opening is a coupling member approximately T-shaped in side elevation provided with a head portion 11 longer than the greatest diameter of opening 10 with a reduced depending neck portion 12 considerably smaller than the greatest diameter of the opening 10 in which is an aperture 13 to which is connected the eye 14 of a hook 15. The coupling 11 is comparatively narrow in transverse dimension to permit its movement freely in the opening 10 so that the depending neck portion 12 may oscillate to permit free movement of the hook 15 connected therewith and the head portion of the anchor 11 is of sufficient length to prevent any withdrawal of the coupling from the opening 10 without the opening of the eye 14 of the hook. The coupling is so mounted that it may oscillate radially from side to side to thereby freely clear the hook from fouling or "cocking" with respect to the spoon or lure 2, and hold the hook 15 so that the barbed end 16 thereof will normally be disposed rearwardly of the concave face 2 of the spoon or lure which is its proper position. The hook being loosely mounted on the coupling member is permitted to drag through the water and is of sufficient and proper formation so that during the passage of the bait or lure through the water rapidly the hook will be drawn into a position so that the pointed end 16 will lie substantially rearwardly of the concave face of the bait or lure and will assume this position in its passage through the water, so long as the bait or lure is in motion but upon the termination of the movement of the body portion of the bait or lure the hook will fall of its own weight into the position shown in Fig. 1.

I claim,

1. A fish hook comprising a spoon or lure arcuately fashioned in transverse and longitudinal section thereby providing a concavo-convex structure, a line attached at one end thereof, said spoon or lure provided near the opposite end with a sector-shaped opening, a loosely mounted coupling positioned in said opening and a hook connected with said coupling.

2. A fish hook comprising a spoon or lure provided with a sector-shaped opening therethrough, a coupling member loosely mounted therein, and a hook connected with said coupling.

3. A fish hook comprising a spoon or lure provided with a sector-shaped opening therethrough, a coupling member T-shaped in side elevation loosely mounted in said opening, said coupling provided with a head larger than the greatest diameter of said opening and with a depending portion provided with an aperture and a hook provided with an eye extending through the aperture of said coupling.

4. A fish hook comprising a spoon or lure provided with a sector-shaped opening, the pointed end of said opening extending toward the front of the spoon or lure and the arcuate portion turned rearwardly, a coupling member loosely mounted in said opening and a hook connected with said coupling.

5. A spoon or lure hook comprising a spoon or lure arcuately fashioned in transverse and longitudinal section thereby providing a concavo-convex structure, said spoon or lure provided at the front end with an opening for a line connection, the rear median portion provided with a sector-shaped opening disposed transversely centrally of the spoon or lure body, the pointed portion of said opening directed toward the front end of the spoon or lure, a T-shaped coupling member mounted in said opening and provided with a head larger than said opening, a depending neck portion, and a hook pivotally connected with said depending neck portion.

In testimony whereof I have hereunto set my hand in presence of two subscribing witnesses.

CHARLES T. PFLUEGER.

Witnesses:
JOSEPH E. PFLUEGER,
RALPH E. BACH.

Copies of this patent may be obtained for five cents each, by addressing the "Commissioner of Patents, Washington, D. C."